US008505023B2

(12) United States Patent  (10) Patent No.: US 8,505,023 B2
Kikuchi et al.  (45) Date of Patent: Aug. 6, 2013

(54) METHOD AND SYSTEM FOR ANALYZING A SEQUENCE RELATION BETWEEN A PLURALITY OF JOBS ACROSS A PLURALITY OF TIME SEGMENTS

(75) Inventors: Shinji Kikuchi, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 295 days.

(21) Appl. No.: 12/969,811

(22) Filed: Dec. 16, 2010

(65) Prior Publication Data

US 2011/0154360 A1 Jun. 23, 2011

(30) Foreign Application Priority Data

Dec. 17, 2009 (JP) ................. 2009-285926

(51) Int. Cl.
*G06F 9/46* (2006.01)
(52) U.S. Cl.
USPC ............................ 718/106; 718/101; 718/102
(58) Field of Classification Search
None
See application file for complete search history.

(56) References Cited

U.S. PATENT DOCUMENTS

| 8,185,899 | B2* | 5/2012 | Daly et al. | 718/102 |
| 8,335,759 | B2* | 12/2012 | Kanai | 707/608 |
| 2007/0055558 | A1* | 3/2007 | Shanahan et al. | 705/7 |
| 2008/0065448 | A1* | 3/2008 | Hull et al. | 705/8 |
| 2008/0222640 | A1* | 9/2008 | Daly et al. | 718/103 |
| 2008/0229296 | A1* | 9/2008 | Kanai | 717/154 |
| 2009/0094074 | A1 | 4/2009 | Nikovski et al. | |

FOREIGN PATENT DOCUMENTS

| JP | 07-175668 | 7/1995 |
| JP | 10-214195 | 8/1998 |
| JP | 2009-93620 | 4/2009 |

OTHER PUBLICATIONS

Squillante et al, "Analysis of Job Arrival Patterns and Parallel Scheudling Performance", Elsevier, 1999, p. 137-163.*

* cited by examiner

*Primary Examiner* — Jennifer To
(74) *Attorney, Agent, or Firm* — Fujitsu Patent Center

(57) ABSTRACT

A job analyzing method includes classifying jobs in log data in accordance with a time segment to which an end time of each of the jobs belongs; generating, for first jobs included in a first time segment, first data indicating an execution sequence relation between the first jobs based on end time of the jobs, and generating, for second jobs included in a second time segment succeeding the first time segment, second data indicating an execution sequence relation between the second jobs based on end time of the second jobs; and analyzing an execution sequence relation between the first and second jobs based on the end time of the first jobs and the end time of the second jobs, and generating data indicating the execution sequence relation between the first and second jobs across the first and second time segments.

3 Claims, 31 Drawing Sheets

FIG. 5

| JOB NAME | END TIME POINT |
|---|---|
| J1.sh | 2009/06/05 00:05:00 |
| J2.sh | 2009/06/05 00:08:00 |
| J3.sh | 2009/06/05 00:20:00 |
| ... | |
| J1.sh | 2009/06/06 00:10:00 |
| J3.sh | 2009/06/06 00:15:00 |
| J2.sh | 2009/06/06 00:25:00 |
| ... | |
| J1.sh | 2009/06/07 00:07:00 |
| J2.sh | 2009/06/07 00:10:00 |
| J3.sh | 2009/06/07 00:30:00 |
| ... | |

FIG. 7

| JOB NAME | EARLIEST END TIME POINT (min) | LATEST END TIME POINT (max) |
|---|---|---|
| J1.sh | 00:05:00 | 00:10:00 |
| J2.sh | 00:08:00 | 00:25:00 |
| J3.sh | 00:15:00 | 00:30:00 |

FIG. 11

| DIVISION ID | DIVISION TIME POINT |
|---|---|
| b1 | 03:00 |

FIG. 12

| SEGMENT ID | BELONGING JOBS |
|---|---|
| p1 | J1, J2, J3, J4, J5 |
| p2 | J6, J7, J8, J9, J10 |

FIG. 13

| DIVISION ID | DIVISION TIME POINT |
|---|---|
| b1 | 03:00 |
| b2 | 01:20 |

FIG. 14

| SEGMENT ID | BELONGING JOBS | |
|---|---|---|
| p11 | J1, J2 | J3 |
| p12 | J4, J5 | |
| p2 | J6, J7, J8, J9, J10 | |

FIG. 15

| DIVISION ID | DIVISION TIME POINT |
|---|---|
| b2 | 01:20 |
| b1 | 03:00 |
| b3 | 04:45 |

FIG. 16

| SEGMENT | BELONGING JOBS | |
|---------|----------------|-----|
| p11 | J1, J2 | J3 |
| p12 | J4, J5 | |
| p21 | J6, J7 | J8 |
| p22 | J9, J10 | |

FIG. 18

| JOB NAME | END TIME POINT |
|---|---|
| J1.sh | 2009/06/05 00:05:00 |
| J2.sh | 2009/06/05 00:08:00 |
| J1.sh | 2009/06/06 00:10:00 |
| J2.sh | 2009/06/06 00:25:00 |
| J1.sh | 2009/06/07 00:07:00 |
| J2.sh | 2009/06/07 00:10:00 |
| ... | |

FIG. 21

| NODE NAME | JOB NAME |
|---|---|
| N1 | J1.sh |
| N2 | J2.sh |
| N4 | J4.sh |
| N5 | J5.sh |
| N6 | J6.sh |
| N7 | J7.sh |
| N9 | J9.sh |
| N10 | J10.sh |

FIG. 22

| LINK NAME | PRECEDING NODE | SUCCEEDING NODE |
|---|---|---|
| L1 | N1 | N2 |
| L2 | N4 | N5 |
| L3 | N6 | N7 |
| L4 | N9 | N10 |

FIG. 27

| NODE NAME | JOB NAME |
|---|---|
| N1 | J1.sh |
| N2 | J2.sh |
| N3 | J3.sh |
| N4 | J4.sh |
| N5 | J5.sh |
| N6 | J6.sh |
| N7 | J7.sh |
| N8 | J8.sh |
| N9 | J9.sh |
| N10 | J10.sh |

FIG. 28

| LINK NAME | PRECEDING NODE | SUCCEEDING NODE |
|---|---|---|
| L1 | N1 | N2 |
| L2 | N4 | N5 |
| L3 | N6 | N7 |
| L4 | N9 | N10 |
| L5 | N1 | N3 |
| L6 | N3 | N5 |
| L7 | N2 | N4 |
| L8 | N6 | N8 |
| L9 | N8 | N10 |
| L10 | N7 | N9 |
| L11 | N5 | N6 |

METHOD AND SYSTEM FOR ANALYZING A SEQUENCE RELATION BETWEEN A PLURALITY OF JOBS ACROSS A PLURALITY OF TIME SEGMENTS

CROSS REFERENCES TO RELATED APPLICATIONS

This application is based upon and claims the benefit of priority of the prior Japanese Patent Application No. 2009-285926, filed on Dec. 17, 2009, the entire contents of which are incorporated herein by reference.

FIELD

The embodiments discussed herein are related to technology for analyzing a relation between jobs.

BACKGROUND

A large number of batch jobs are executed on large-scale systems. A batch job refers to processing of data in a group at once. For example, batch jobs include jobs that are performed at once every predetermined period, such as a daily sales calculation process. Batch jobs are typically processed in accordance with programs or scripts. There are various types of sequence relation between batch jobs, and in many cases batch jobs interact with each other. For example, there are cases where a sales calculation process is started after an order finalization process is finished. There are also cases where when batch job A outputs file C, batch job B on standby starts processing of the file C.

However, the sequence relation between batch jobs cannot be checked easily in some cases. For example, if batch job B is started in response to a message outputted upon execution of a program for batch job A, the sequence relation between the batch jobs cannot be identified unless the program is analyzed. Also, recently many business mergers have been taking place, and such mergers are also accompanied by integration of a plurality of systems. If developers and administrators are different in such cases, situations can arise where desired batch sequence relation defining information cannot be accessed.

A technique called process mining is known. Process mining refers to a technique for estimating how tasks are connected from a set of the results (e.g. logs) of execution sequence of tasks in business processes. Specifically, process mining uses an α-algorithm, its improved algorithm, a genetic algorithm, or the like. However, since most process mining techniques assume business processes executed by humans, the underlying assumption is that each single process includes only several to a dozen or so tasks at most. Therefore, if the number of tasks per process increases, the computational complexity significantly increases. For example, it is known that for algorithms with good accuracy (e.g. α++ algorithm), the computational complexity increases exponentially. In other words, it is difficult to obtain results within a reasonable time.

SUMMARY

According to a certain aspect of the invention, a job analyzing method which is executed by a computer, includes classifying a plurality of jobs included in log data in accordance with a time segment, among a plurality of time segments, to which an end time point of each of the jobs belongs; generating, for a plurality of first jobs included in a first time segment among the plurality of time segments, first data indicating an execution sequence relation between the first jobs on the basis of end time points of the jobs, and generating, for a plurality of second jobs included in a second time segment succeeding the first time segment among the plurality of time segments, second data indicating an execution sequence relation between the second jobs on the basis of end time points of the second jobs; and analyzing an execution sequence relation between the first jobs included in the first time segment and the second jobs included in the second time segment, on the basis of the end time points of the first jobs included in the first time segment and the end time points of the second jobs included in the second time segment, and generating data indicating the execution sequence relation between the first and second jobs across the first time segment and the second time segment.

The object and advantages of the invention will be realized and attained by at least the features, elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 illustrates an example of log data.

FIG. 7 illustrates an example of data indicating ranges of variation in execution time of jobs.

FIG. 11 illustrates an example of division time point data.

FIG. 12 illustrates an example of a relation between partitions and jobs.

FIG. 13 illustrates an example of division time point data.

FIG. 14 illustrates an example of a relation between partitions and jobs.

FIG. 15 illustrates an example of division time point data.

FIG. 16 illustrates an example of a relation between partitions and jobs.

FIG. 18 illustrates an example of log data used in a first job analysis process.

FIG. 21 illustrates an example of a node table after the first job analysis process.

FIG. 22 illustrates an example of a link table after the first job analysis process.

FIG. 27 illustrates an example of a final node table.
FIG. 28 illustrates an example of a final link table.

DESCRIPTION OF EMBODIMENTS

[Embodiment 1]

Figure 1:
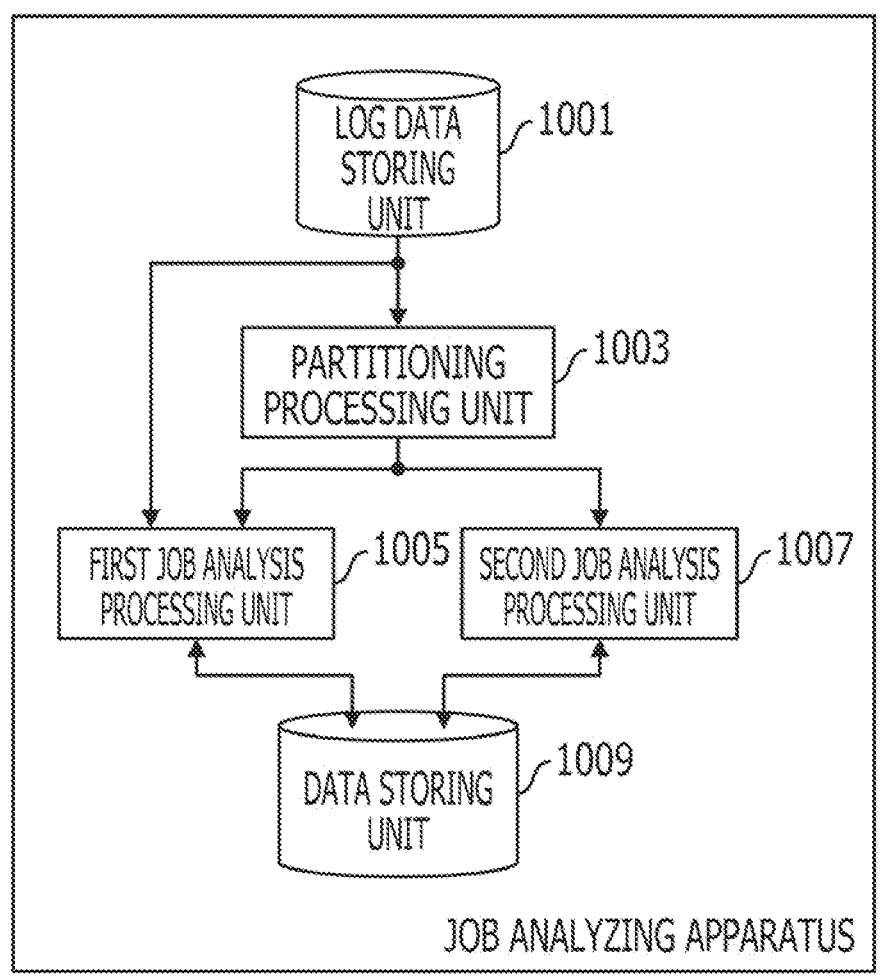
FIG. 1 illustrates an example of a job analyzing apparatus according to a first embodiment.

FIG. 1 is a functional block diagram of a job analyzing apparatus according to a first embodiment. The job analyzing apparatus according to the first embodiment has a log data storing unit 1001, a partitioning processing unit 1003, a first job analysis processing unit 1005, a second job analysis processing unit 1007, and a data storing unit 1009. The partitioning processing unit 1003 performs processing by using log data stored in the log data storing unit 1001. The first job analysis processing unit 1005 performs processing by using the processing results of the partitioning processing unit 1003 and log data stored in the log data storing unit 1001, and stores the processing results into the data storing unit 1009. The second job analysis processing unit 1007 performs processing by using data stored in the data storing unit 1009, and the processing results of the partitioning processing unit 1003, and stores the processing results into the data storing unit 1009.

Figure 2:
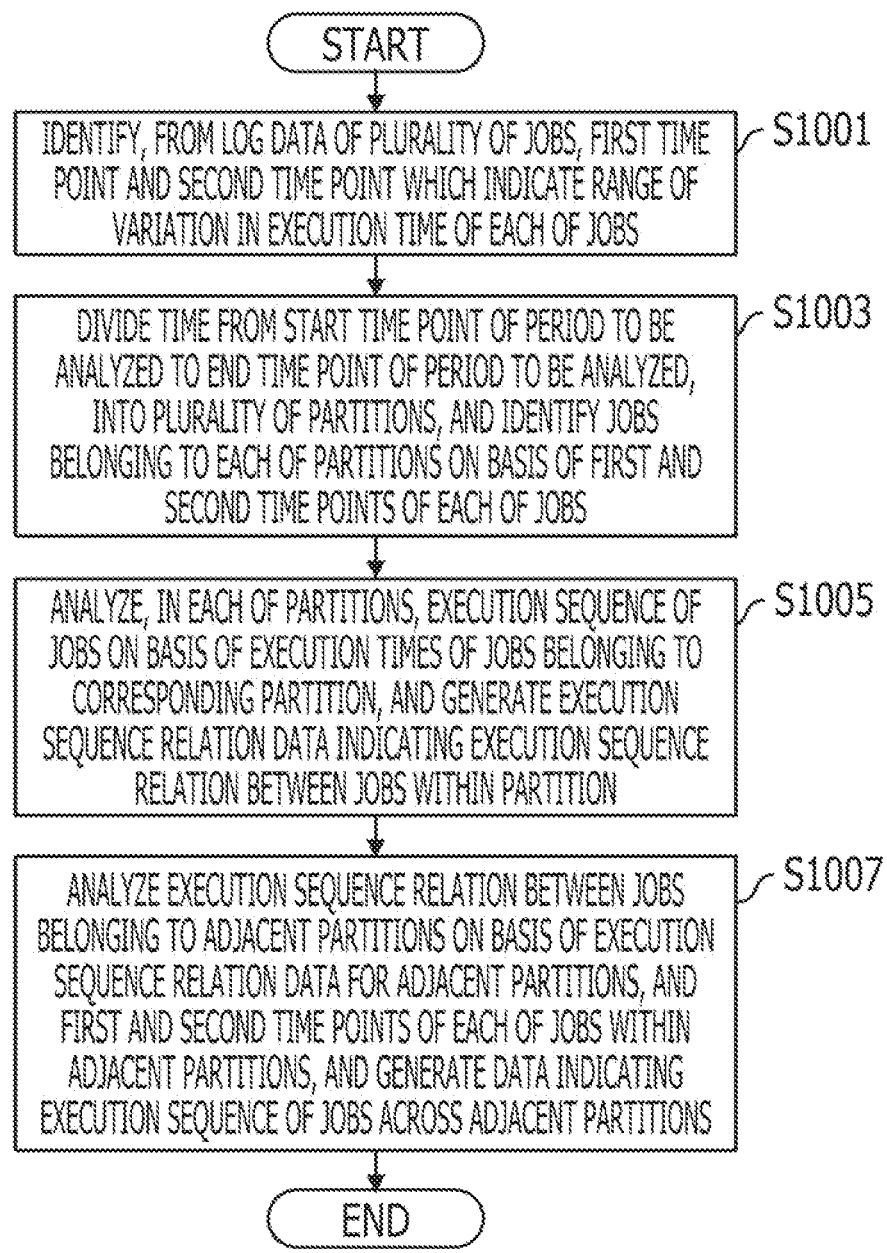
FIG. 2 illustrates a processing flow according to the first embodiment.

Next, details of processing executed by the job analyzing apparatus illustrated in FIG. 1 are described with reference to FIG. 2. First, the partitioning processing unit 1003 identifies, from log data of a plurality of jobs, a first time point and a second time point which indicate a range of variation in execution time of each of the jobs (step S1001). Also, the partitioning processing unit 1003 divides the time from the start time point of a period to be analyzed to the end time point of the period to be analyzed, into a plurality of partitions, and identifies jobs belonging to each of the partitions on the basis of the first and second time points of each of the jobs (step S1003). Such processing results of the partitioning processing unit 1003 are outputted to the first and second job analysis processing units 1005 and 1007.

Next, the first job analysis processing unit 1005 analyzes, in each of the partitions, the execution sequence of jobs on the basis of the execution times of jobs belonging to the corresponding partition (e.g. data grasped from log data stored in the log data storing unit 1001), generates execution sequence relation data indicating the execution sequence relation between the jobs within the partition, and stores the execution sequence relation data into the data storing unit 1009 (step S1005). When the time from the start time point to end time point of the period to be analyzed is divided into a plurality of partitions, and execution sequence relation data for jobs is generated for each of the partitions in this way, it is possible to substantially prevent the processing time required for job analysis from increasing exponentially with the number of jobs.

Then, the second job analysis processing unit 1007 analyzes the execution sequence relation between jobs belonging to adjacent partitions, on the basis of the execution sequence relation data for the adjacent partitions, and the first and second time points of each of the jobs within the adjacent partitions, generates data indicating the execution sequence of jobs across the adjacent partitions, and stores the data into the data storing unit 1009 (step S1007). Since the processing load on the second job analysis processing unit 1007 is not very large, the processing time as a whole can be also limited so as to be only proportional to the number of jobs at most.

[Embodiment 2]

Next, a second embodiment will be described. It should be noted that in this embodiment, a description will be given of a case in which a batch job is analyzed as an example of a job. However, this embodiment is applicable as long as log data can be obtained a plurality of times for a plurality of general jobs that are associated with each other.

Figure 3:
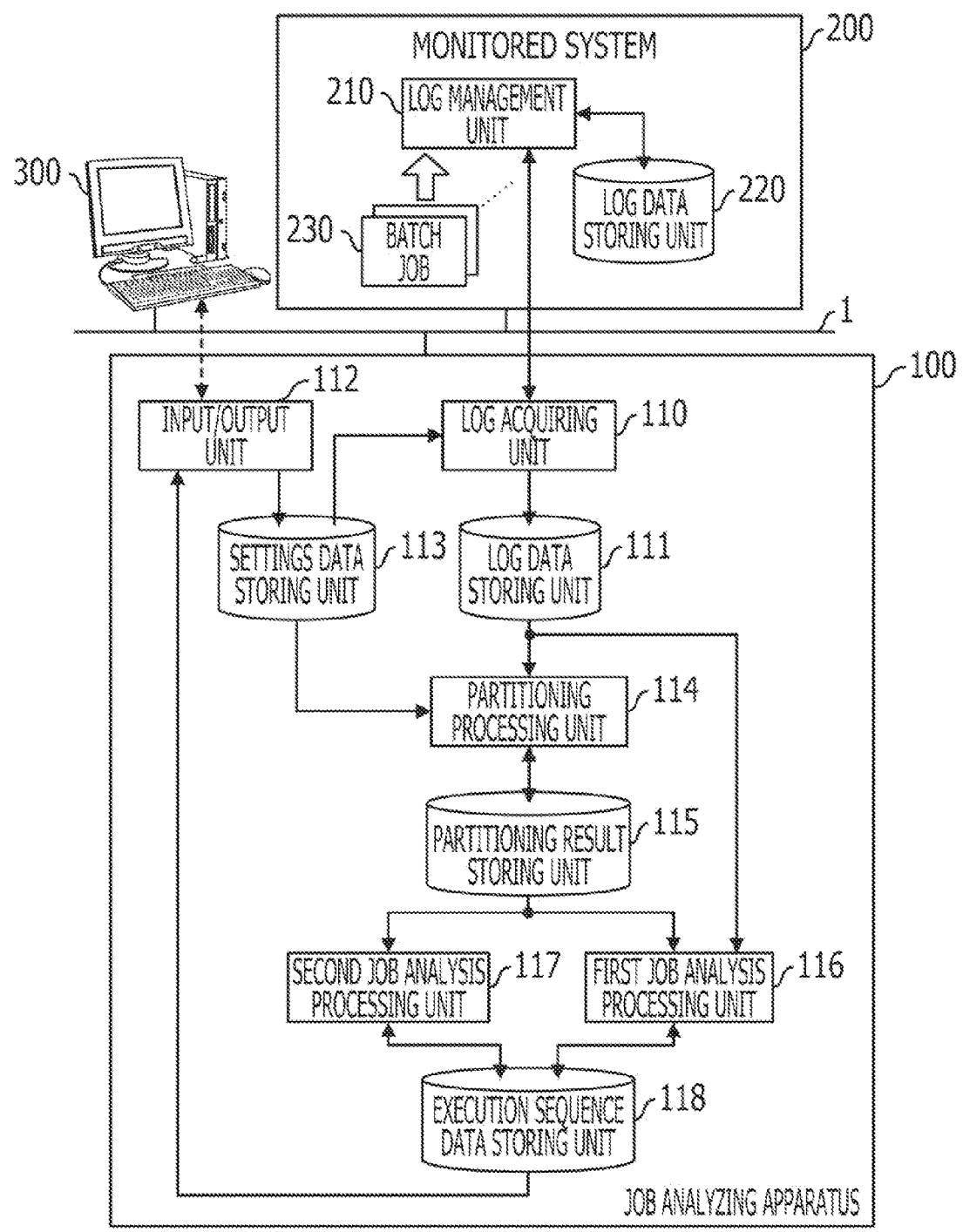
FIG. 3 illustrates an example of a system according to a second embodiment.

A functional block diagram of a system according to the second embodiment is illustrated in FIG. 3. For example, at least one administrator's terminal 300 operated by an administrator (also called manager), a monitored system 200, and a job analyzing apparatus 100 are connected to a network 1 that is an intra-local area network (LAN). In some cases, the administrator's terminal 300 is, for example, a personal computer on which, for example, a dedicated application program that interacts with the job analyzing apparatus 100 is being executed. Also, in some cases, a mechanism is employed in which the administrator's terminal 300 is executing a Web browser, and displays Web page data received from the job analyzing apparatus 100 and, as required, receives data input and transmits the data to the job analyzing apparatus 100.

The monitored system 200 that executes a batch job 230 has a log management unit 210 that performs processing such as monitoring the execution status of the batch job 230, and a log data storing unit 220 for storing log data outputted by the log management unit 210 as data indicating the execution status of the batch job 230. The log management unit 210 also performs processing such as outputting log data stored in the log data storing unit 220 to the job analyzing apparatus 100 upon request from the job analyzing apparatus 100.

Also, the job analyzing apparatus 100 has (A) an input/output unit 112 that serves as an interface with the administrator's terminal 300, (B) a settings data storing unit 113 for storing settings data received by the input/output unit 112 from the administrator's terminal 300, (C) a log acquiring unit 110 that acquires log data from the monitored system 200 in accordance with the settings data stored in the settings data storing unit 113, and (D) a log data storing unit 111 for storing the log data acquired by the log acquiring unit 110.

In addition, the job analyzing apparatus 100 further has (E) a partitioning processing unit 114 that performs processing by using the log data stored in the log data storing unit 111 in accordance with the settings data stored in the settings data storing unit 113, and (F) a partitioning result storing unit 115 for storing the processing results of the partitioning processing unit 114.

Furthermore, the job analyzing apparatus 100 has (G) a first job analysis processing unit 116 that performs processing by using the data stored in the log data storing unit 111 and the partitioning result storing unit 115, (H) an execution sequence data storing unit 118 for storing the processing results of the first job analysis processing unit 116, and the like, and (I) a second job analysis processing unit 117 that performs processing by using the data stored in the partitioning result storing unit 115 and the execution sequence data storing unit 118.

The processing results of the second job analysis processing unit 117 are also stored in the execution sequence data storing unit 118. The data stored in the execution sequence data storing unit 118 is transmitted to the administrator's terminal 300 upon request from the administrator's terminal 300, for example.

Figure 4:
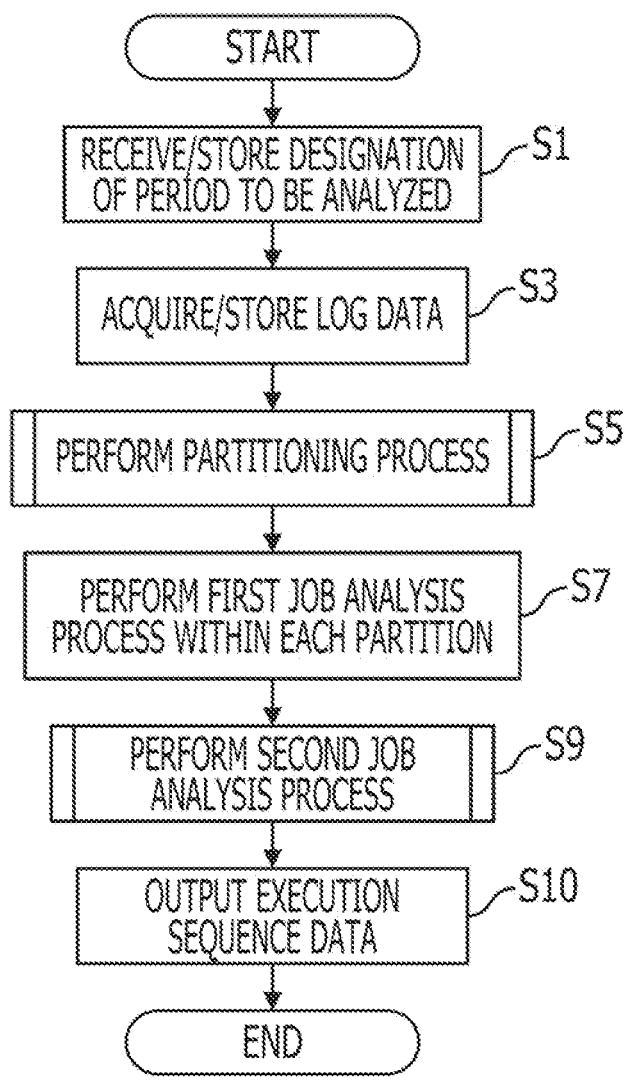
FIG. 4 illustrates a main processing flow according to the second embodiment.

Next, details of processing executed by the system illustrated in FIG. 3 will be described with reference to FIGS. 4 to 28. First, the input/output unit 112 receives, from the administrator's terminal 300, the analysis start time point and analysis end time point of a period to be analyzed as settings data, and stores the settings data into the settings data storing unit 113 (FIG. 4: step S1). For example, data such as an analysis start time point "0:00" and an analysis end time point "6:00" is stored. Additionally, the input/output unit 112 may receive, from the administrator's terminal 300, the recording period of log data to be acquired out of log data stored in the log data storing unit 220 of the monitored system 200, and store the recording period into the settings data storing unit 113. If such a recording period is not received from the administrator's terminal 300, an initial value (e.g. one week's log) is used for the recording period in some cases. Further, an upper limit on the number of jobs belonging to a single segment, which is to be referenced when the partitioning processing unit 114 performs partitioning, is also set and stored in this step in some cases. For this upper limit on the number of jobs as well, an initial value is used in some cases.

The log acquiring unit 110 acquires, from the log management unit 210, log data within the recording period stored as settings data in the settings data storing unit 113, and stores the log data into the log data storing unit 111 (step S3). It should be noted that there are also cases where log data is cumulatively accumulated in the log data storing unit 111. In such cases, for example, the log acquiring unit 110 periodically acquires new log data from the log management unit 210 of the monitored system 200. Hence, acquisition of log data is not performed in the flow of processing in FIG. 4.

The log data storing unit 111 stores, for example, data as illustrated in FIG. 5. In the example in FIG. 5, for each batch job executed, the corresponding job name (or identifier) and end time point are registered. Although only end time points are registered in the example illustrated in FIG. 5, start time points may be registered as well. In this example, as one property of a batch job, for example, the batch job is executed at substantially the same time point every day. However, cases are also conceivable in which a job is executed not every day but every 12 hours, or in which a series of jobs is executed in response to some predetermined event. In such cases, the processing described below may be performed in such a way that, for example, with the start time point or end time point of the first executed job taken as a reference, relative time points are computed with respect to other time points. It should be noted that in cases where such relative time points are used, the analysis start time point and the analysis end time point are also relative time points.

Figure 6:
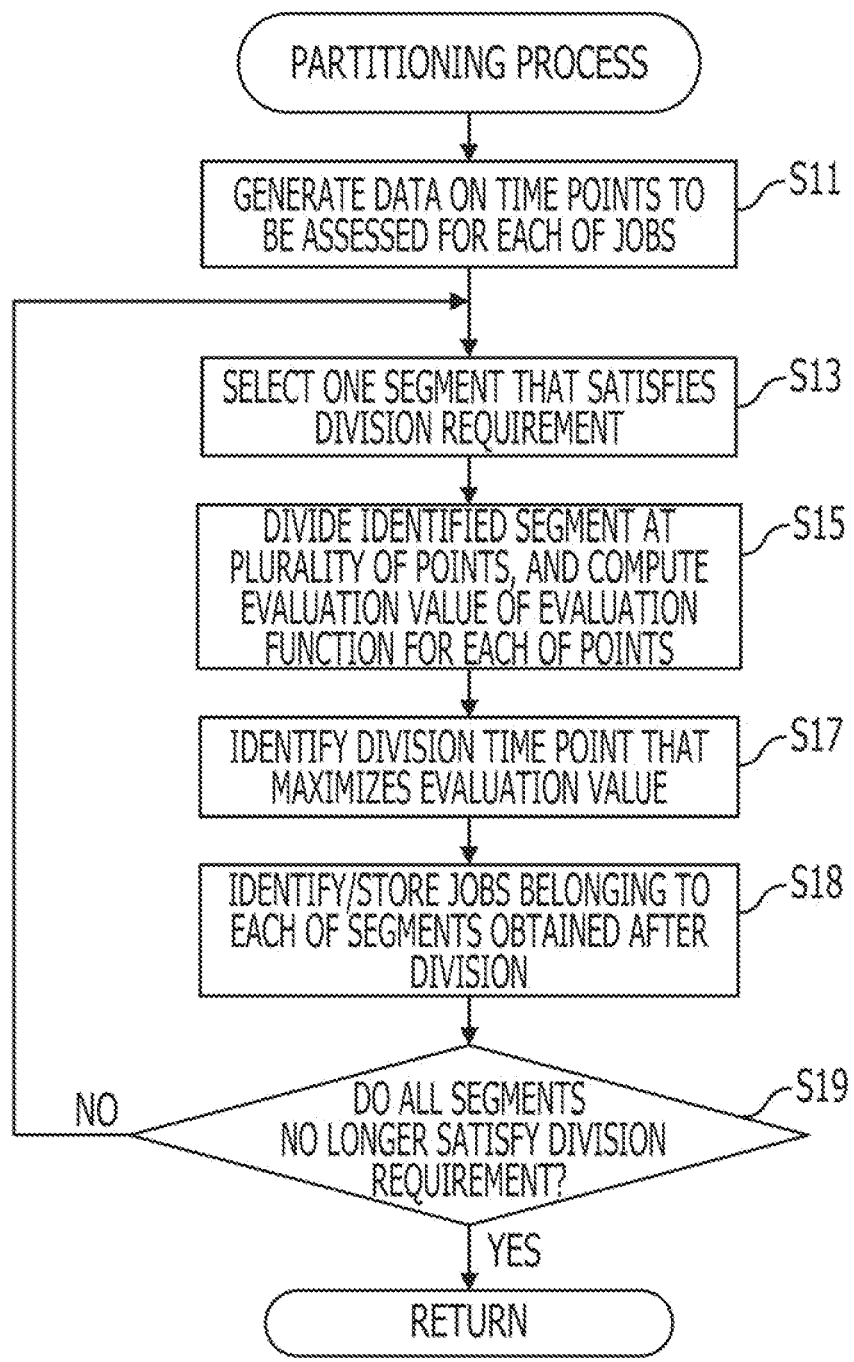
FIG. 6 illustrates a processing flow of a partitioning process.

Next, the partitioning processing unit 114 performs a partitioning process (step S5). The partitioning process will be described with reference to FIGS. 6 to 16. First, the portioning processing unit 114 extracts, from the log data storing unit 111, log data from analysis start time points to analysis end time points stored in the settings data storing unit 113, generates data on time points to be assessed for each of jobs from the extracted log data, and stores the data into the partitioning result storing unit 115 (FIG. 6: step S11).

In this embodiment, as the time points to be assessed, the earliest time point and the latest time point among the end time points of a job are extracted from the log data. In the case of the example illustrated in FIG. 5, for a job with the job name "J1. sh", the earliest time point among the end time points of the job is "00:05:00", and the latest time point is "00:10:00". Likewise, for a job with the job name "J2. sh", the earliest time point among the end time points of the job is "00:08:00", and the latest time point is "00:25:00". For a job with the job name "J3. sh", the earliest time point among the end time points of the job is "00:15:00", and the latest time point is "00:30:00". In this way, the range of variation in execution time of a job is identified from the earliest time point and the latest time point among the end time points of the job. It should be noted that if start time points and end time points are included in log data, the range of variation in execution time is identified from the earliest time point among the start time points, and the latest time point among the end time points. By performing such processing, for example, data as illustrated in FIG. 7 is stored into the partitioning result storing unit 115. In the example in FIG. 7, for every job, the corresponding job name, earliest end time point, and latest end time point are registered. It should be noted that in the following description, the earliest end time point and the latest end time point are sometimes indicated as "min" and "max", respectively.

Next, the partitioning processing unit 114 identifies one segment that satisfies a division requirement, within the time interval from the analysis start time point to the analysis end time point stored in the settings data storing unit 113 (step S13). This division requirement is stored in the settings data storing unit 113, and is the above-mentioned requirement that a number of jobs equal to or greater than the "the upper limit on the number of jobs belonging to a single segment" belong to a single segment. This upper limit on the number of jobs is dependent on the throughput of the first job analysis processing unit 116. In other words, if the first job analysis processing unit 116 is slow in processing, the upper limit on the number of jobs is lowered. On the other hand, if the processing is fast, the upper limit on the number of jobs may be raised. Furthermore, when performing step S13 for the first time, the corresponding segment is the entire time interval from the analysis start time point to the analysis end time point. By repeatedly performing the processing described below, division of a segment is performed recursively, and a plurality of segments are generated. A job belonging to a segment indicates a job whose earliest end time point "min" and latest end time point "max" are both included within the time from the start time point and end time point of the segment.

Figure 8:
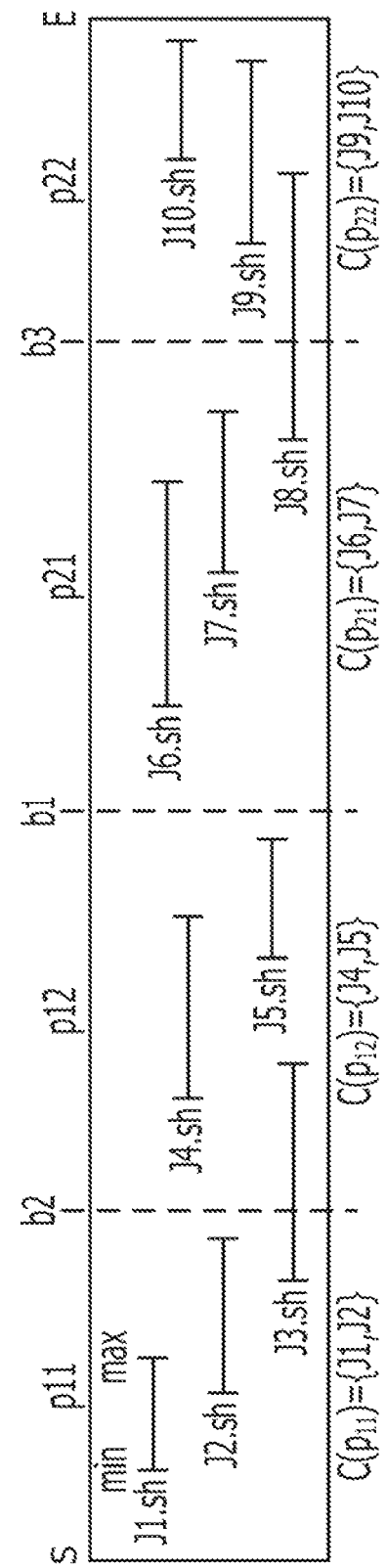
FIG. 8 illustrates a relation between partitions and jobs.

Now, the relation between jobs and segments are schematically illustrated in FIG. 8. FIG. 8 illustrates a case in which the time from an analysis start time point S to an analysis end time point E is divided into four segments. It should be noted J denotes a set of jobs executed within the time from the analysis start time point S to the analysis end time point E. In the example illustrated in FIG. 8, 10 jobs J1 to J10 exist. It should be noted that a job name such as J1. sh is sometimes abbreviated as J1. Also, P denotes a set of partitions. In this embodiment, "segments" generated upon completion of a partitioning process are referred to as partitions. In the case of finally dividing into four partitions as illustrated in FIG. 8, partitions p11 to p22 are included in the set P. Further, letting bm be the division time point between partitions pm and pm+1, a set B includes all division time points bm. It should be noted that the following relation holds: $\forall bi:(bi<bi+1) \wedge (S<bi<E)$.

Also, as described above, a set of jobs whose "min" and "max" are both included in a segment pm is denoted as C(pm), and when Jk∈C(pm), a job Jk is referred to as "belonging to" the segment pm.

As is apparent from FIG. 8, the jobs J1 and J2 belong to the partition p11, and the jobs J4 and J5 belong to the partition p12. However, the job J3 belongs to neither of the partitions. Likewise, the jobs J6 and J7 belong to the partition p21, and the jobs J9 and J10 belong to the partition p22. However, the job J8 belongs to neither of the partitions. In this embodiment, these jobs J3 and J8 are each referred to as "non-belonging job".

A non-belonging job Jx is represented as follows.

$$J_x \notin C(p_i) \cup C(p_{i+1}) \wedge J_x \in C(p_i + p_{i+1}) \quad (1)$$

Returning to the description of the processing in FIG. 6, the partitioning processing unit 114 provisionally divides the segment identified in step S13 at a plurality of points, computes the evaluation value of an evaluation function with respect to each of the points, and stores the evaluation value into a storage device such as a main memory, for example (step S15). For example, the partitioning processing unit 114 provisionally divides the segment in two at predetermined intervals, and identifies belonging jobs for each of the resulting sub-segments.

In this embodiment, a segment is to be divided in such a way that the number of non-belonging jobs is as small as possible and the difference between the numbers of jobs belonging to the two divided segments is as small as possible. By performing division in this way, job analysis can be performed with good accuracy (more specifically, without contradictions) and in a short processing time in a first job analysis process described below.

Specifically, in this embodiment, an evaluation value is computed by using the following evaluation function V.

$$V = \underbrace{\frac{|C(p')| + |C(p'')|}{|C(p)|}}_{A} \cdot \underbrace{\left(1 - \left|\frac{|C(p')| - |C(p'')|}{|C(p)|}\right|\right)}_{B} \quad (2)$$

In Equation (2), it is assumed to divide a segment p into a segment p' and a segment p", and |C(p)| represents the number of jobs belonging to the segment p.

The value of the portion A of this evaluation function V becomes larger as the number of jobs belonging to two segments obtained after the division becomes larger. The value of the portion B becomes larger as the difference between the respective numbers of jobs belonging to the two segments obtained after the division becomes smaller. As indicated by Equation (2), the evaluation function V is the product of A and B. The fact that the evaluation function V is a product indicates that it is no good if only the value of the portion A is large, nor is it any good if only the value of the portion B is large, but segment division is to be performed in such a way that these two values should balance out to provide a large evaluation value as a whole.

It should be noted that Equation (2) is an example, and other evaluation functions that achieve the above-mentioned purpose may be employed as well.

A specific example of calculation of the evaluation function V will be described with reference to FIG. 9. In this example, an evaluation value of the evaluation function is computed for each of the cases of division at a time point b1 and division at a time point b2 when dividing the segment p into the segments p' and p". It should be noted that C(p)={J1, J2, J3, J4, J5}, and |C(p)|=5. When dividing at the time point b1, C(p')={J1, J2} and C(p")={J4, J5}, and thus |C(p')|=2 and |C(p")|=2. Accordingly, the portion A of Equation (2) is (2+2)/5=0.8, and the portion B is (1−(2−2)/5)=1, thus resulting in V=0.8 as a whole. In this case, there is only one non-belonging job (only J3).

On the other hand, when dividing at the time point b2, C(p')={J1, J2} and C(p")={J5}, and thus |C(p')|=2 and |C(p")|=1. Accordingly, the portion A of Equation (2) is (2+1)/5=0.6, and the portion B is (1−(2−1)/5)=0.8, thus resulting in V=0.48 as a whole. In this case, there are two non-belonging jobs (J3 and J4).

Figure 9:
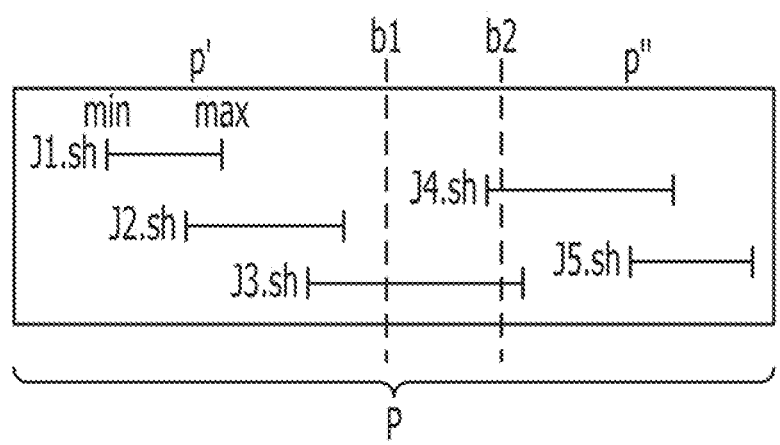
FIG. 9 illustrates partitions and an example of calculation of an evaluation function.

Therefore, it is found that of the two cases illustrated in FIG. 9, dividing at the time point b1 is more preferable.

Figure 10:
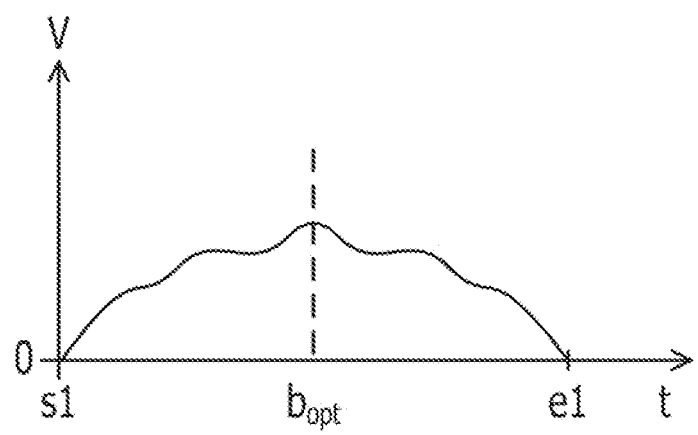
FIG. 10 illustrates an example of how the evaluation value of an evaluation function changes.

For example, as illustrated in FIG. 10, while varying a division time point b from a start time point s1 to an end time point e1 of the segment p, the division time point bopt that maximizes the evaluation value of the evaluation function V is identified.

It should be noted that jobs belonging to each of segments generated by provisional division are preferably retained every time the evaluation value of the evaluation function V is computed.

Various existing optimization algorithms can be applied to efficiently search for the division time point bopt. However, a method may be used in which, as described above, evaluation values of the evaluation function V are calculated exhaustively at every predetermined interval to find the division time point bopt that gives the largest evaluation value. The amount of processing does not become enormous even when such method is used.

Returning to the description of the processing in FIG. 6, the partitioning processing unit 114 identifies the division time point that maximizes the evaluation value of the evaluation function V computed as a result of provisional division, and stores data of the division time point into the partitioning result storing unit 115 (step S17). Also, for each of divided segments generated on the basis of the identified division time point, the partitioning processing unit 114 identifies jobs belonging to the corresponding segment, and stores data of jobs belonging to each segment into the partitioning result storing unit 115 (step S18). In the case illustrated in FIG. 9, the division time point b1, the jobs J1 and J2 belonging to the segment p' obtained after division, and the jobs J4 and J5 belonging to the segment p" are stored into the partitioning result storing unit 115.

Figure 11:
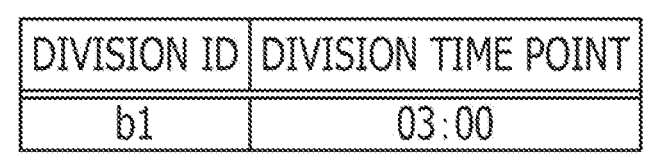

When performing a partitioning process with respect to the segment as illustrated in FIG. 8, upon performing the first segment division, data as illustrated in each of FIGS. 11 and 12 is stored in the partitioning result storing unit 115. FIG. 11 illustrates a table in which to register division time points. A division time point "03:00" is registered in association with a division ID "b1". FIG. 12 illustrates a table in which to register jobs belonging to segments. Corresponding belonging job names are registered in association with segment IDs. That is, the jobs J1 to J5 are registered in association with a segment p1. Also, the jobs J6 to J10 are registered in association with a segment p2.

Upon performing the second segment division, data as illustrated in each of FIGS. 13 and 14 is stored in the partitioning result storing unit 115. By the second segment division, the segment p1 is divided into segments p11 and p12. FIG. 13 represents a state after FIG. 11, with a division time point "01:20" additionally registered in association with a division ID "b2". Also, FIG. 14 represents a state after FIG. 12, and indicates that the jobs J1 and J2 belong to the segment p11 (C(p11)={J1, J2}), the jobs J4 and J5 belong to the segment p12 (C(p12)={J4, J5}), and the non-belonging job J3 that previously belonged to the segment p1 but belongs to neither of the segments p11 and p12 exists. For the non-belonging job J3 as well, it is preferable to retain data regarding which segment the job J3 belongs to. In the example illustrated in FIG. 8, the job J3 belongs to a segment p11+p12, so it is preferable to retain data C(p11+p12)={J1, J2, J3, J4, J5}.

Upon performing the third segment division, data as illustrated in each of FIGS. 15 and 16 is stored in the partitioning result storing unit 115. FIG. 15 represents a state after FIG. 13, with a division time point "04:45" additionally registered in association with a division ID "b3". FIG. 16 represents a state after FIG. 14, and indicates that the jobs J6 and J7 belong to the segment p21 (C(p21)={J6, J7}), the jobs J9 and J10 belong to the segment p22 (C(p22)={J9, J10}), and the non-belonging job J8 that previously belonged to the segment p2 but is belonging to neither of the segments p21 and p22 exists. For the non-belonging job J8 as well, it is preferable to retain data regarding which segment the job J8 belongs to. In the example illustrated in FIG. 8, the job J8 belongs to a segment p21+p22, so it is preferable to retain data C(p21+p22)={J6, J7, J8, J9, J10}.

Returning to the description of the processing in FIG. 6, the partitioning processing unit 114 judges whether or not all segments no longer satisfy the division requirement (step S19). The number of belonging jobs is counted for all segments, and it is judged whether or not the number of jobs has become less than the upper limit on the number of jobs which serves as the division requirement. If there is even one segment for which the counting result becomes larger than or equal to the upper limit, the processing returns to step S13, and division is performed again with respect to the segment whose number of belonging jobs has become larger than or equal to the upper limit. Letting the upper limit be t, it is checked whether or not the following condition that can be written as the expression below is satisfied: $\forall pi:|C(Pi)|<t$.

Since division is performed again only with respect to the segment whose number of belonging jobs becomes larger than or equal to the upper limit, if only the segment p11 out of the segments p11 and p12 obtained by dividing the segment p1 has a number of belonging jobs larger than or equal to the upper limit, the segment p11 is divided into segments p111 and p112.

On the other hand, if all segments no longer satisfy the division requirement, the processing returns to the original processing. The segments finally obtained in this way are referred to as partitions. Further, as will be described below, segments that have been linked will be also referred to as partitions.

By performing the processing described above, a substantially uniform number of jobs smaller than or equal to the upper limit on the number of jobs belong to each of partitions. In this way, the amount of processing in the first job analysis process described below does not become too large, and also the first job analysis process can be performed with good accuracy.

Figure 17:
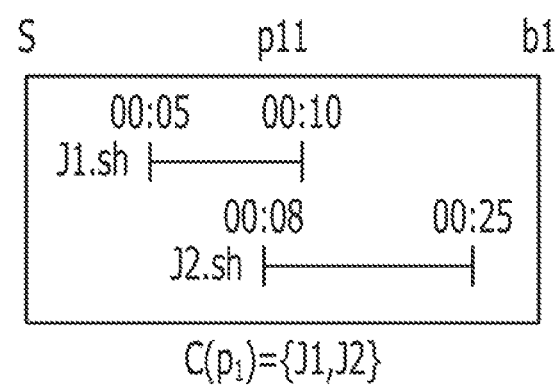
FIG. 17 illustrates a relation between some of partitions and jobs.
Figure 19:
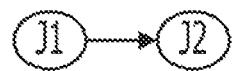
FIG. 19 illustrates an example of execution sequence data after the first job analysis process is partially performed.

Returning to the description of the processing in FIG. 4, next, by using data stored in the partitioning result storing unit 115 and the log data storing unit 111, the first partitioning processing unit 116 performs, with respect to each of partitions, a first job analysis process of identifying the execution sequence of jobs belonging to the corresponding partition, and stores the generated data into the execution sequence data storing unit 118 (step S7). FIG. 17 illustrates only the partition p11 extracted from FIG. 8. It is identified from data stored in the partitioning result storing unit 115 that only the jobs J1 and J2 belong to the partition p11 (i.e. C(p11)={J1, J2}) in this way. In such a case, as illustrated in FIG. 18, log data for each of the jobs J1 and J2 is extracted from the log data storing unit 111, and on the basis of the temporal relation between the end time points of the jobs J1 and J2, it is judged whether the job J1 is executed earlier or the job J2 is executed earlier. In the example illustrated in FIG. 18, it is apparent that the job J1 is ended earlier even on different dates. Through such analysis, the execution sequence of jobs within the partition p11 is identified to be such that as illustrated in FIG. 19, the job J2 is executed after the job J1. It should be noted that in FIG. 19, jobs are regarded as nodes, and an arrow is drawn from the job that is executed earlier toward the job that is executed later, thus indicating their execution sequence. Although the case in FIG. 17 is a very simple case, basically a similar process is performed even when the number of jobs is 3 or larger. Generally, execution sequence data within a partition is generated by application of techniques such as an $\alpha$-algorithm, improved versions of $\alpha$-algorithm, a genetic algorithm, or further a heuristics search employed in process mining.

Figure 20:
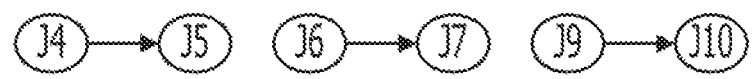
FIG. 20 illustrates an example of execution sequence data after the first job analysis process.
Figure 23:
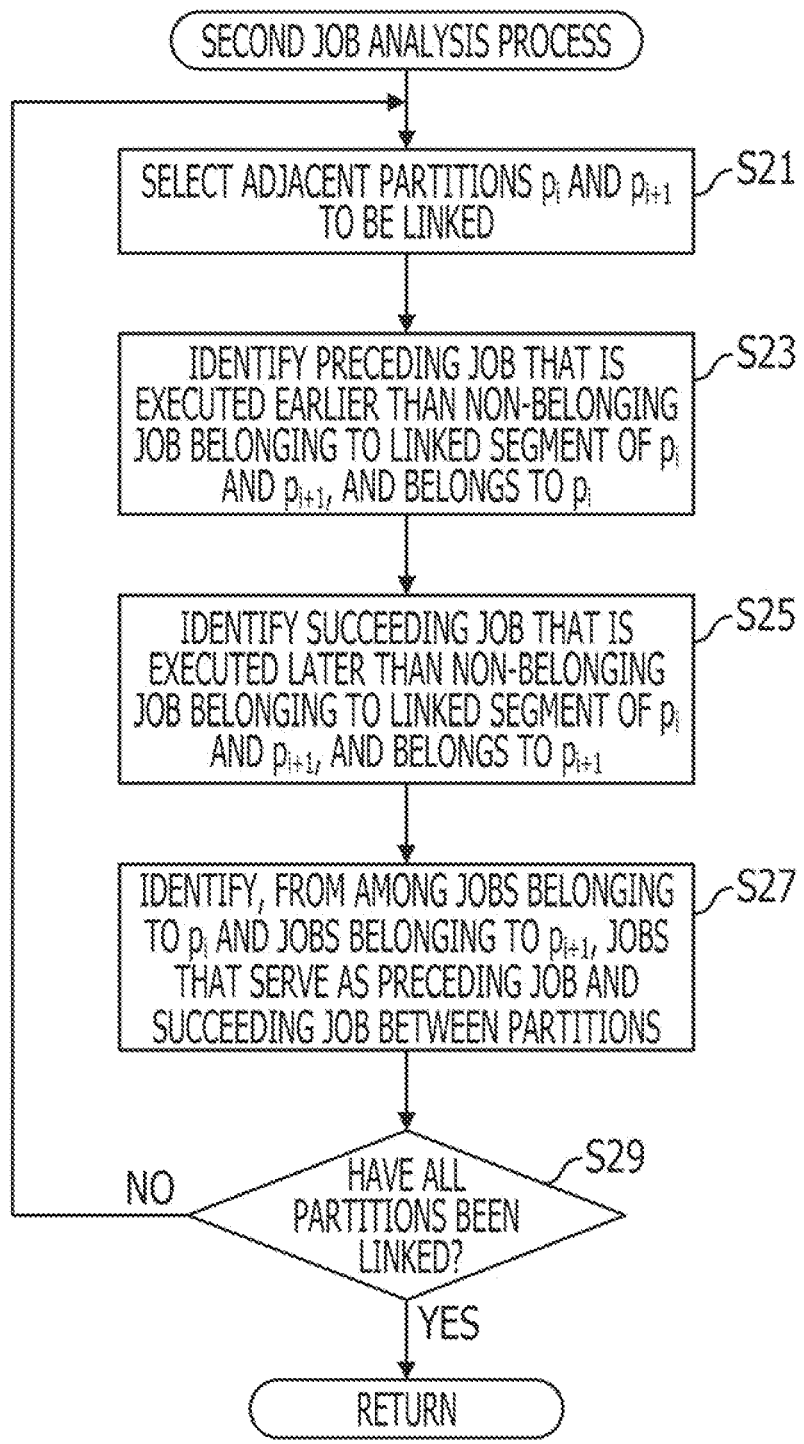
FIG. 23 illustrates a processing flow of a second job analysis process.

For the partitions p12, p21, and p22 illustrated in FIG. 8 as well, execution sequence data as schematically illustrated in FIG. 20 is obtained. That is, the job J5 is executed after the job J4, the job J7 is executed after the job J6, and the job J10 is executed after the job J9.

Such execution sequence data is stored into the execution sequence data storing unit 118 in a form as illustrated in FIGS. 21 and 22, for example. That is, FIG. 21 is a node table, in which job names are registered in association with node names. Also, FIG. 22 is a link table, in which a preceding node name and a succeeding node name are registered for each of link names generated by the first job analysis processing unit 116.

In this embodiment, execution sequence data is generated within each of partitions whose number of belonging jobs is subject to limitation. Thus, processing is simplified, and processing is completed within a reasonable processing time even when using an algorithm used in process mining. Conversely speaking, the upper limit on the number of belonging jobs may be determined so that processing is completed within a reasonable processing time. Since the processing time differs for each algorithm, the upper limit on the number of belonging jobs may be also determined in accordance with the algorithm employed in the first job analysis process.

Further, since processing is done on a partition-by-partition basis in this way, parallel processing is possible. That is, by sharing the first job analysis process for a plurality of partitions among a plurality of processors in such a way that the partition p11 is processed by a first processor and the partition p12 is processed by a second processor, a corresponding reduction in processing time can be achieved.

From FIGS. 21 and 22 alone, only execution sequence data within a partition has been obtained but the execution sequence between partitions has not been analyzed. Also, while the jobs J3 and J8 are identified as non-belonging jobs in the example in FIG. 8, these non-belonging jobs have not been considered, either. Accordingly, a second job analysis process is performed.

Returning to the description of the processing in FIG. 4, next, the second partitioning processing unit 117 performs the second job analysis process by using data stored in the partitioning result storing unit 115 and the log data storing unit 111 (step S9). The second job analysis process will be described with reference to FIGS. 23 to 28.

First, the second job analysis processing unit 117 selects adjacent partitions pi and pi+1 to be linked, on the basis of the data stored in the partitioning result storing unit 115 (step S21). To generate consistent execution sequence data, for example, the number of non-belonging jobs belonging to the linked segment of the adjacent partitions pi and pi+1 is counted for every pair of adjacent partitions, and adjacent partitions with the largest number of non-belonging jobs are selected in this step.

If there is no non-belonging job in any linked segment of adjacent partitions, steps S23 and S25 described below are skipped. That is, upon detecting in step S21 that adjacent partitions with no non-belonging job are to be linked, the processing transfers to step S27.

Next, the second job analysis processing unit 117 identifies a preceding job that is executed earlier than a non-belonging job belonging to the linked segment of the selected adjacent partitions pi and pi+1, and belongs to the partition pi (step S23). This process uses the data on the earliest end time points and the latest end time points illustrated in FIG. 7.

In this embodiment, in the preceding partition pi, a preceding job Jy to be executed earlier is identified. The preceding job Jy is identified as a job whose time interval from the earliest end time point to the latest end time point does not overlap the time interval from the earliest end time point to the latest end time point of a non-belonging job Jx, and whose latest end time point is closest to the earliest end time point of the non-belonging job Jx. More specifically, a search is started from the terminal node (node for which no succeeding node is defined) in the execution sequence data of the preceding partition pi, and the latest end time point of a job on a searched node is compared with the earliest end time point of the non-belonging job Jx. If the latest end time point of the job on the searched node precedes the earliest end time point of the non-belonging job Jx, the job on the searched node is identified as the preceding job Jy. If a plurality of terminal nodes exist, jobs are processed in decreasing order of latest end time point.

Figure 24:
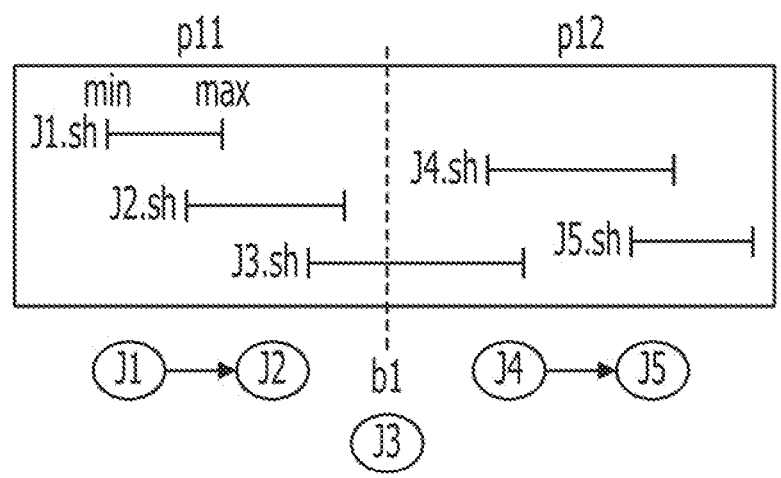
FIG. 24 illustrates a relation between partitions and jobs.

For example, consider a case in which the partition p11 and the partition p12 are linked as illustrated in FIG. 24. As is appreciated from FIG. 24, with respect to the non-belonging job J3, it is judged which one of the jobs J1 and J2 belonging to the partition p11 is a preceding job. In this case, a search is started from the terminal job J2 in the execution sequence data of the partition p11. The latest end time point of the job J2 is later than the earliest end time point of the non-belonging job J3. Therefore, the job J2 is not the preceding job Jy. Then, by going back through the execution sequence data from the job J2, the job J1 is set as a searched job. Comparing the latest end time point of the job J1 with the earliest end time point of the non-belonging job J3, the latest end time point of the job J1 is earlier than the earliest end time point of the non-belonging job J3. Therefore, the job J1 is the preceding job Jy.

If there are a plurality of non-belonging jobs to be processed, step S23 is performed with respect to all of the non-belonging jobs to be processed.

The execution sequence data identified in this way is stored in the execution sequence data storing unit 118.

Also, the second job analysis processing unit 117 identifies a succeeding job that is executed later than a non-belonging job belonging to the linked segment of the selected adjacent partitions pi and pi+1, and belongs to the partition pi+1 (step S25). As in step S23, this process uses the data on the earliest end time points and the latest end time points illustrated in FIG. 7.

In this embodiment, in the succeeding partition pi+1, a succeeding job Jz to be executed later is identified. The succeeding job Jz is identified as a job whose time interval from the earliest end time point to the latest end time point does not overlap the time interval from the earliest end time point to the latest end time point of the non-belonging job Jx, and whose earliest end time point is closest to the latest end time point of the non-belonging job Jx. More specifically, a search is started from the top node (node for which no preceding node is defined) in the execution sequence data of the succeeding partition pi+1, and the earliest end time point of a job on a searched node is compared with the latest end time point of the non-belonging job Jx. If the earliest end time point of the job on the searched node succeeds the latest end time point of the non-belonging job Jx, the job on the searched node is identified as the succeeding job Jz. If a plurality of top nodes exist, jobs are processed in increasing order of earliest end time point.

For example, in the example in FIG. 24, with respect to the non-belonging job J3, it is judged which one of the jobs J4 and J5 belonging to the partition p12 is a succeeding job. In this case, a search is started from the top job J4 in the execution sequence data of the partition p12. The earliest end time point of the job J4 is earlier than the latest end time point of the non-belonging job J3. Therefore, the job J4 is not the succeeding job Jz. Then, by going back through the execution sequence data from the job J4, the job J5 is set as a searched job. Comparing the earliest end time point of the job J5 with the latest end time point of the non-belonging job J3, the earliest end time point of the job J5 is later than the latest end time point of the non-belonging job J3. Therefore, the job J5 is the succeeding job Jz.

If there are a plurality of non-belonging jobs to be processed, the processing of step S25 is also performed with respect to all of the non-belonging jobs to be processed.

The execution sequence data identified in this way is stored in the execution sequence data storing unit 118.

Further, the second job analysis processing unit 117 identifies, from among the jobs belonging to the partition pi and the jobs belonging to the partition pi+1, jobs that serve as a preceding job and a succeeding job between the partitions (step S27). In a simple case, the terminal node in the execution sequence data of the preceding partition pi is identified as the preceding job, and the top node in the execution sequence data of the succeeding partition pi+1 is identified as the succeeding job. It should be noted, however, that there are cases where a plurality of terminal nodes exist or a plurality of top nodes exist. In such cases, the job with the latest end time point in the preceding partition pi may be identified as the preceding job, and the job with the earliest end time point in the succeeding partition pi+1 may be identified as the succeeding job.

Figure 25:
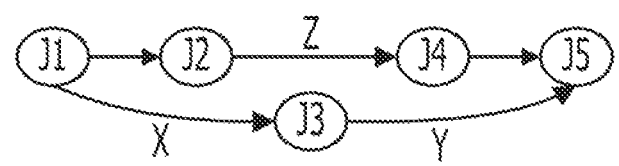
FIG. 25 illustrates part of execution sequence data.

When such processing is performed, the jobs J1 to J5 belonging to the linked segment of the adjacent partitions p11 and p12 illustrated in FIG. 24 are converted into the execution sequence data as illustrated in FIG. 25. In FIG. 25, a link X between the job J1 and the job J3 is set in step S23, a link Y between the job J3 and the job J5 is set in step S25, and a link Z between the job J2 and the job J4 is set in step S27. In other words, the preceding and succeeding jobs are identified.

Then, the second job analysis processing unit 117 judges whether or not all partitions have been linked (step S29). By managing the presence/absence of linking by using data on partitions stored in the partitioning result storing unit 115, it is judged whether or not processing has been performed for all adjacent partitions. If there are partitions that have not been linked, the processing returns to step S21. On the other hand, if all partitions have been linked, the processing returns to the original processing.

Figure 26:
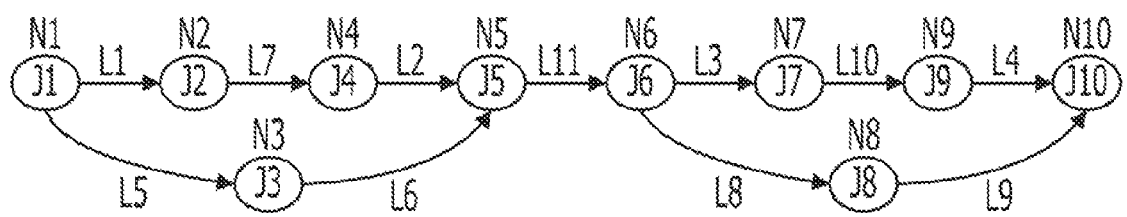
FIG. 26 illustrates an example of execution sequence data.

In the example in FIG. 8, the partitions p11 and p12 are linked, the partitions p21 and p22 are linked, and further the linked segment of the partitions p11 and p12 and the linked segment of the partitions p21 and p22 are linked. Finally, the execution sequence data as illustrated in FIG. 26 is completed. The job J6 and the job J8 are respectively identified as a preceding job and a succeeding job by step S23, the job J8 and the job J10 are respectively identified as a preceding job and a succeeding job by step S25, and the job J7 and the job J9 are respectively identified as a preceding job and a succeeding job by step S27, and finally, the job J5 and the job J6 are respectively identified as a preceding job and a succeeding job by step S27.

Finally, the data as illustrated in each of FIGS. 27 and 28 is stored in the execution sequence data storing unit 118. As illustrated in FIG. 27, the non-belonging jobs J3 and J8 are additionally registered in the node table. As illustrated in FIG. 28, a link L5 and a link L11 are additionally registered in the link table. Links L5 to L7 are links generated when linking the partitions p11 and p12, links L8 to L10 are links generated when linking the partitions p21 and p22, and the link L11 is a link generated when linking the linked segment of the partitions p11 and p12 and the linked segment of the partitions p21 and p22.

By performing the above-mentioned processing, the execution sequence is identified for all jobs, and job execution sequence data representing the execution sequence is generated.

Returning to the description of the processing in FIG. 4, the input/output unit 112 reads execution sequence data stored in the execution sequence data storing unit 118, and outputs the execution sequence data to the administrator's terminal 300 (step S10). Upon receiving the execution sequence data from the job analyzing apparatus 100, the administrator's terminal 300 may present the diagram of the execution sequence data as illustrated in FIG. 26, or may present the data as illustrated in FIGS. 27 and 28.

In this way, the sequence relation between jobs from the analysis start time point to the analysis end time point can be grasped. The data used at this time is log data of jobs, and data such as information defining the execution sequence of batch jobs or data access destination is not used. Thus, the administrator can easily grasp the relation between jobs. It should be noted that this is only an estimation from log data, and can differ from the actual events occurring prior or subsequent thereto in some cases.

The following uses of such execution sequence data are conceivable. (1) To verify whether a series of batch jobs are running properly. (2) To identify the root cause when a fault (e.g. a delay) occurs in the execution of a given batch job A, by retracing the batch jobs executed before the batch job A and associated with the batch job A. (3) To prevent, when a fault occurs in a given batch job A, spread of damage due to the fault (such as a chain of delays or deadline violations) by identifying the succeeding batch jobs affected by the fault, and notifying the manager of the system executing those batch jobs of the affected succeeding batch jobs.

In the second embodiment, the reduced amount of processing makes it possible to grasp the execution sequence relation between jobs even with respect to a monitored system on which a large number of jobs are executed. It should be noted that in the case of employing a process mining technique with which the processing time varies exponentially (e.g. mn) with the number n of jobs, if the number of partitions is d, the processing time can be reduced to $d*m^{n/d}$. For example, if m=2, n=320, and d=32, if the processing mining technique is simply applied, $m^n=2.1\times10^{96}$, but in accordance with the second embodiment, $d*m^{n/d}=3.3\times10^4$.

[Embodiment 3]

Figure 29:
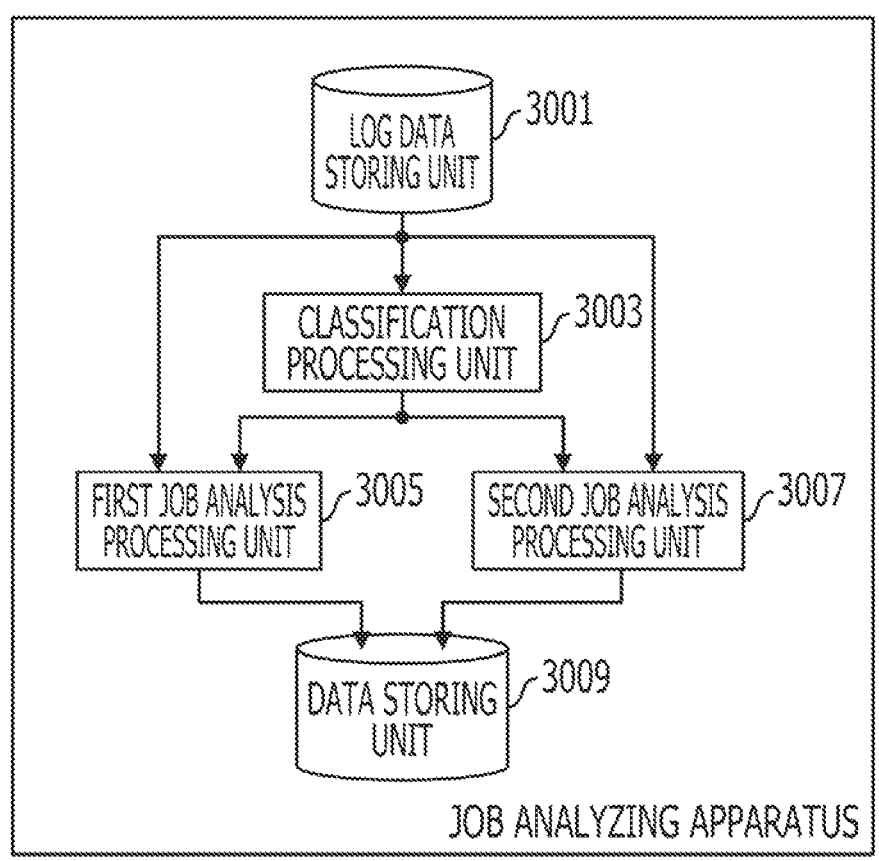
FIG. 29 illustrates an example of a job analyzing apparatus according to a third embodiment.

A functional block diagram of a job analyzing apparatus according to a third embodiment is illustrated in FIG. 29. The job analyzing apparatus according to the third embodiment has a log data storing unit 3001, a classification processing unit 3003, a first job analysis processing unit 3005, a second job analysis processing unit 3007, and a data storing unit 3009. The classification processing unit 3003 performs processing by using log data stored in the log data storing unit 3001. The first job analysis processing unit 3005 performs processing by using the processing results of the classification processing unit 3003 and the log data stored in the log data storing unit 3001, and stores the processing results into the data storing unit 3009. The second job analysis processing unit 3007 performs processing by using the processing results of the classification processing unit 3003 and the log data stored in the log data storing unit 3001, and stores the processing results into the data storing unit 3009.

Figure 30:
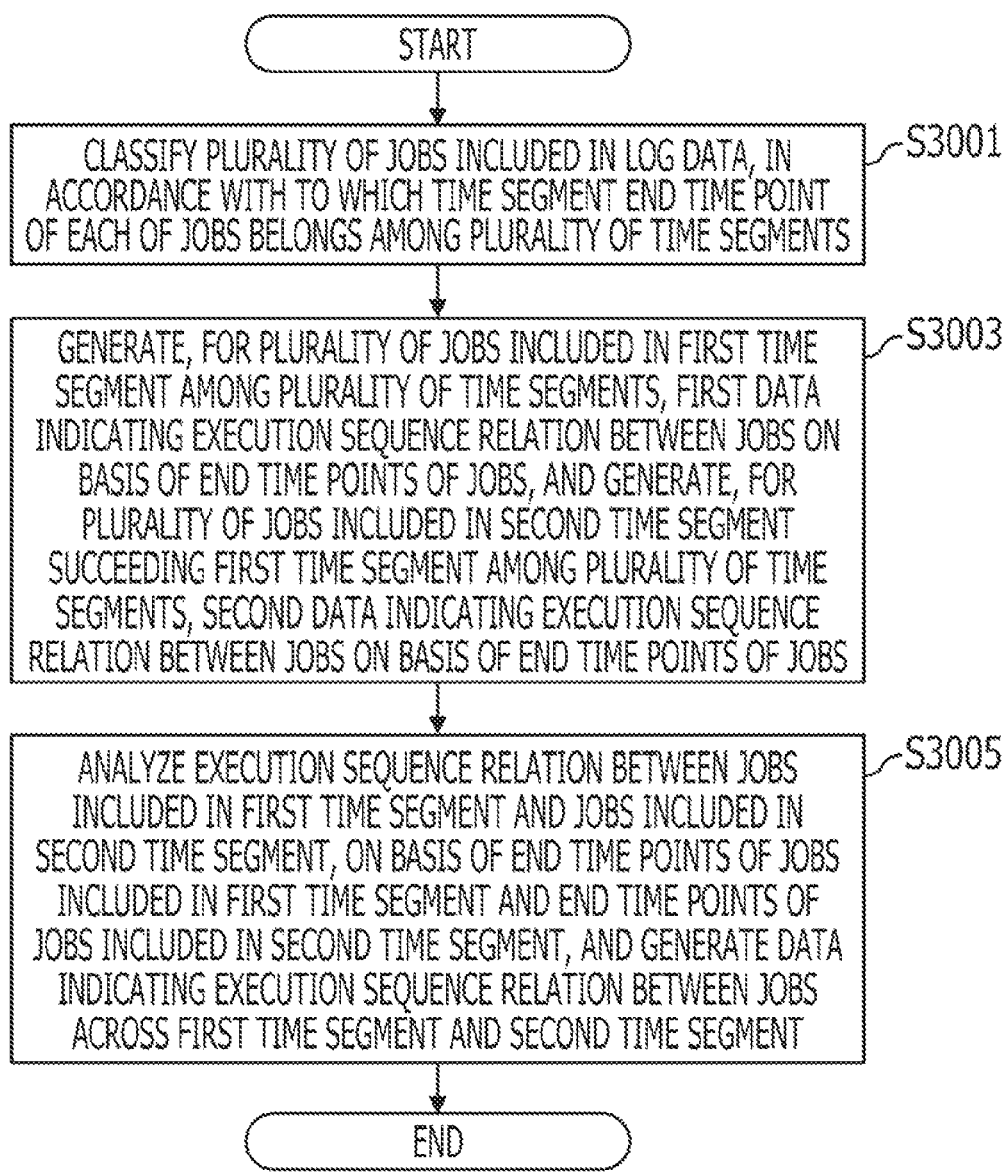
FIG. 30 illustrates a processing flow according to the third embodiment.

Next, details of processing executed by the job analyzing apparatus illustrated in FIG. 29 are described with reference to FIG. 30. First, the classification processing unit 3003 classifies a plurality of jobs included in log data stored in the log data storing unit 3001, in accordance with to which time segment the end time point of each of the jobs belongs among a plurality of time segments (step S3001). Such processing results of the classification processing unit 3003 are outputted to the first and second job analysis processing units 3005 and 3007.

Next, the first job analysis processing unit 3005 generates, for a plurality of jobs included in a first time segment among the plurality of time segments, first data indicating the execution sequence relation between the jobs on the basis of the end time points of the jobs, and generates, for a plurality of jobs included in a second time segment succeeding the first time segment among the plurality of time segments, second data indicating the execution sequence relation between the jobs on the basis of the end time points of the jobs. The first job analysis processing unit 3005 then stores the first data and the second data into the data storing unit 3009 (step S3003).

Then, the second job analysis processing unit 3007 analyzes the execution sequence relation between the jobs included in the first time segment and the jobs included in the second time segment, on the basis of the end time points of the jobs included in the first time segment and the end time points of the jobs included in the second time segment, generates data indicating the execution sequence relation between jobs across the first time segment and the second time segment, and stores the data into the data storing unit 3009 (step S3005).

While embodiments of the present invention have been described above, the present invention is not limited to these embodiments. For example, the functional block diagram of the job analyzing apparatus illustrated in FIG. 3 is an example, and does not necessarily match the actual program module configuration. Furthermore, for the processing flow as well, it is possible to interchange the order of steps or perform parallel execution as long as the processing results do not change.

While FIG. 3 illustrates an example of a client server system, all functions may be performed by, for example, a stand-alone computer. Furthermore, the function of the job analyzing apparatus 100 may be shared among a plurality of computers.

Figure 31:
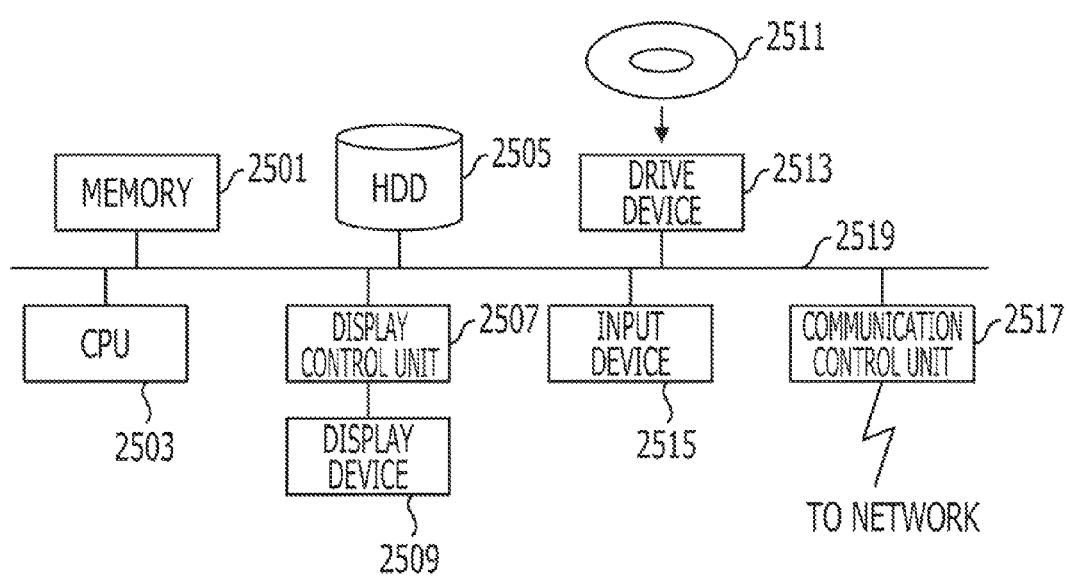
FIG. 31 illustrates an example of a configuration of a computer.

It should be noted that the job analyzing apparatus described above can be also implemented by a computer apparatus. For example, as illustrated in FIG. 31, as the computer apparatus, a computer may be used which includes a memory 2501, a processor (CPU 2503), a hard disk drive (HDD) 2505, a display control unit 2507 connected to a display device 2509, a drive device 2513 for a removable disc 2511, an input device 2515, and a communication control unit 2517 for connecting to a network, and in which these components are connected to each other via a bus 2519. An operating system (OS) and an application program for performing processing according to this embodiment may be stored in a storing unit such as the HDD 2505 in advance, and may be read for use from the HDD 2505 into the memory 2501 when executed by the CPU 2503. As desired or required, the CPU 2503 may perform operations by controlling the display control unit 2507, the communication control unit 2517, and the drive device 2513. Also, mid-processing data may be stored into the memory 2501 and, as required, may be stored into the HDD 2505. In this embodiment, the above-mentioned application program for performing processing may be distributed while stored on the removable disc 2511 that is computer-readable, and installed from the drive device 2513 into the HDD 2505. In some cases, the application program is installed into the HDD 2505 via a network such as the Internet and the communication control unit 2517. Such a computer apparatus may implement the various functions described above through organic cooperation between the hardware described above such as the CPU 2503 and the memory 2501, the OS, and a required application program. It should be noted that the log data storing unit 1001 and the data storing unit 1009 in FIG. 1 may be implemented as the memory 2501, the HDD 2505, or the like in FIG. 31. The same applies to the log data storing unit 3001 and the data storing unit 3009 in FIG. 29. The partitioning processing unit 1003, the first job analysis processing unit 1005, and the second job analysis processing unit 1007 in FIG. 1 may be implemented by a combination of the processor 2503 and a program, that is, by execution of the program by the processor 2503. More specifically, the processor 2503 may function as each of the processing units described above by operating in accordance with a program stored in the HDD 2505 or the memory 2501. The same applies to the classification processing unit 3003 and the first and second job analysis processing units 3005 and 3007 in FIG. 29.

A summary of this embodiment described above is given below.

(A) A plurality of jobs included in log data are classified in according with to which time segment the end time point of each of the jobs belongs among a plurality of time segments (first, second, and so on). (B) Then, for a plurality of jobs included in a first time segment, first data indicating the execution sequence relation between the jobs is generated on the basis of the end time points of the jobs, and for a plurality of jobs included in a second time segment succeeding the first time segment, second data indicating the execution sequence relation between the jobs is generated on the basis of the end time points of the jobs. (C) Then, the execution sequence relation between the jobs included in the first time segment and the jobs included in the second time segment is analyzed on the basis of the end time points of the jobs included in the first time segment and the end time points of the jobs included in the second time segment, and data indicating the execution sequence relation between jobs across the first time segment and the second time segment is generated (that is, an integration process is performed). Preferably, the integration process is performed with respect to the N-th time segment and the (N+1)th time segment (N ranges from 1 to M−1 (M is the number of divisions)) so as to generate data indicating the execution relation between jobs for all of the plurality of time segments from the first to last time segments.

Also, a job analyzing method according to another aspect includes (A) a step of identifying, from log data of a plurality of jobs stored in a log data storing unit, a first time point and a second time point which indicate a range of variation in execution time of each of the jobs, (B) a dividing step of dividing the time from the start time point of a period to be analyzed to end time point of the period to be analyzed, into a plurality of partitions, and identifying jobs belonging to each of the partitions on the basis of the first time point and the second time point of each of the jobs, (C) a step of analyzing, in each of the partitions, the execution sequence relation between the jobs belonging to the partition on the basis of execution times of the jobs, generating execution sequence relation data indicating the execution sequence relation between the jobs within the partition, and storing the execution sequence relation data into a data storing unit, and (D) a linking step of analyzing the execution sequence relation between jobs belonging to adjacent partitions, on the basis of the execution sequence relation data for the adjacent partitions, and the first time point and the second time point of each of the jobs within the adjacent partitions, generating data indicating the execution sequence of jobs across the adjacent partitions, and storing the data into the data storing unit.

The execution sequence of a large number of jobs can be grasped within a reasonable time from data that can be easily acquired from the outside of a monitored system on which the large number of jobs are executed.

The dividing step described above may include a detailed dividing step of determining a time point for dividing a pre-division time interval including a first segment and a second segment into the first segment and the second segment in accordance with an evaluation value outputted by an evaluation function, the evaluation value becoming larger with a decreasing difference between the number of first jobs whose time interval from the first time point to the second time point is included within the time from a start time point to an end time point of the first segment, and the number of second jobs whose time interval from the first time point to the second time point is included within the time from a start time point to an end time point of the second segment, and becoming larger with a decreasing number of jobs which belong to neither the first segment nor the second segment but whose time interval from the first time point to the second time point is included within the time from a start time point to an end time point of the pre-division time interval. Use of such an evaluation function allows partitioning to the performed in a favorable manner, thereby generating consistent execution sequence data in subsequent processing.

The detailed dividing step described above may be executed recursively until the number of belonging jobs becomes less than a threshold. In this way, the number of jobs belonging to each partition can be made less than the threshold, thereby shortening the processing time required for generating execution sequence data within a partition.

Further, the linking step described above may include, if a non-belonging job whose time interval from the first time point to the second time point exists across adjacent partitions exists, (a) a step of identifying, from among jobs belonging to a preceding partition of the adjacent partitions, a job whose time interval from the first time point to the second time point does not overlap the time interval from the first time point to the second time point identified with respect to the non-belonging job, and of which the second time point is identified to be closest to the first time point identified with respect to the non-belonging job, and generating data for identifying the identified job as a preceding job and the non-belonging job as a succeeding job, (b) a step of identifying, from among jobs belonging to a succeeding partition of the adjacent partitions, a job whose time interval from the first time point to the second time point does not overlap the time interval from the first time point to the second time point identified with respect to the non-belonging job, and of which the first time point is identified to be closest to the second time point identified with respect to the non-belonging job, and generating data for identifying the identified job as a succeeding job and the non-belonging job as a preceding job, and (c) a step of identifying, as a preceding job, a job of which the second time point is latest among the jobs belonging to the preceding partition of the adjacent partitions, identifying, as a succeeding job, a job of which the first time point is earliest among the jobs belonging to the succeeding partition of the adjacent partitions, and generating data for identifying the preceding job and the succeeding job.

In this way, even when there are non-belonging jobs, the execution sequence across partitions can be identified.

Further, the above-mentioned linking step may be performed by giving priority to adjacent partitions with the largest number of non-belonging jobs. This makes it possible to generate execution sequence data with greater consistency.

It should be noted that a program for causing a computer to perform the above-mentioned processing may be created. The program is stored on, for example, a computer-readable recording medium, such as a flexible disk, a CD-ROM, a magneto-optical disk, a semiconductor memory (e.g. ROM), or a hard disk, or a storage device. It should be noted that mid-processing data is temporarily saved on a storage device such as a RAM.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiment(s) of the present invention has(have) been described in detail, it should be understood that the various changes, substitutions, and alterations could be made hereto without departing from the spirit and scope of the invention.

What is claimed is:

1. A non-transitory computer-readable recording medium in which a program for causing a computer to execute processing is stored, the processing including:
classifying a plurality of jobs included in log data in accordance with a time segment, among a plurality of time segments, to which an end time point of each of the jobs belongs;
generating, for a plurality of first jobs included in a first time segment among the plurality of time segments, first data indicating an execution sequence relation between the first jobs on the basis of end time points of the first jobs, and generating, for a plurality of second jobs included in a second time segment succeeding the first time segment among the plurality of time segments, second data indicating an execution sequence relation between the second jobs on the basis of end time points of the second jobs; and
analyzing an execution sequence relation between the first jobs included in the first time segment and the second jobs included in the second time segment, on the basis of the end time points of the first jobs included in the first time segment and the end time points of the second jobs included in the second time segment, and generating data indicating the execution sequence relation between the first and second jobs across the first time segment and the second time segment.

2. A job analyzing method which is executed by a computer, comprising:
classifying a plurality of jobs included in log data in accordance with a time segment, among a plurality of time segments, to which an end time point of each of the jobs belongs;
generating, for a plurality of first jobs included in a first time segment among the plurality of time segments, first data indicating an execution sequence relation between the first jobs on the basis of end time points of the jobs, and generating, for a plurality of second jobs included in a second time segment succeeding the first time segment among the plurality of time segments, second data indicating an execution sequence relation between the second jobs on the basis of end time points of the second jobs; and
analyzing an execution sequence relation between the first jobs included in the first time segment and the second jobs included in the second time segment, on the basis of the end time points of the first jobs included in the first time segment and the end time points of the second jobs included in the second time segment, and generating data indicating the execution sequence relation between the first and second jobs across the first time segment and the second time segment.

3. A job analyzing apparatus comprising:
a memory; and
a processor coupled to the memory and configured to:
classify a plurality of jobs included in log data in accordance with a time segment, among a plurality of time segments, to which an end time point of each of the jobs belongs;
generate, for a plurality of first jobs included in a first time segment among the plurality of time segments, first data indicating an execution sequence relation between the first jobs on the basis of end time points of the first jobs;
generate, for a plurality of second jobs included in a second time segment succeeding the first time segment among the plurality of time segments, second data indicating an execution sequence relation between the second jobs on the basis of end time points of the second jobs;
analyze an execution sequence relation between the first jobs included in the first time segment and the second jobs included in the second time segment, on the basis of the end time points of the first jobs included in the first time segment and the end time points of the second jobs included in the second time segment; and
generate data indicating the execution sequence relation between the first and second jobs across the first time segment and the second time segment.

* * * * *